(12) United States Patent
McClure

(10) Patent No.: US 6,651,719 B2
(45) Date of Patent: *Nov. 25, 2003

(54) ADHESIVE STICKER LABELING SYSTEM FOR USE IN IDENTIFYING OWNERSHIP OF COMPACT DISKS

(76) Inventor: Neil L. McClure, 1220 S. Laird Ct., Superior, CO (US) 80027

( * ) Notice: Subject to any disclaimer, the term of this patent is extended or adjusted under 35 U.S.C. 154(b) by 0 days.

This patent is subject to a terminal disclaimer.

(21) Appl. No.: 09/791,090

(22) Filed: Feb. 21, 2001

(65) Prior Publication Data

US 2002/0023713 A1 Feb. 28, 2002

Related U.S. Application Data

(62) Division of application No. 08/573,446, filed on Dec. 15, 1995, now Pat. No. 6,227,273.

(51) Int. Cl.[7] .................................................. B32B 35/00
(52) U.S. Cl. ........................ 156/556; 156/249; 156/580; 156/DIG. 24
(58) Field of Search ................................ 156/249, 556, 156/580, DIG. 24

(56) References Cited

U.S. PATENT DOCUMENTS

| | | |
|---|---|---|
| 4,306,344 A | 12/1981 | Floss |
| 4,726,007 A | 2/1988 | McCormack |
| 4,983,437 A | 1/1991 | Merrick |
| 5,316,464 A | 5/1994 | Lexell |
| 5,421,950 A | 6/1995 | Parrish |
| 5,435,246 A | 7/1995 | Edman |
| 5,518,325 A | 5/1996 | Kahle |
| 5,783,031 A | 7/1998 | Sievers |
| 5,799,982 A * | 9/1998 | McClure |
| 5,902,446 A | 5/1999 | Casillo et al. |
| 6,227,273 B1 * | 5/2001 | McClure ...................... 156/556 |

OTHER PUBLICATIONS

CD–ROM Professional, vol. 8 —No. 10, p. 132, Oct. 1995.

* cited by examiner

*Primary Examiner*—Curtis Mayes
(74) *Attorney, Agent, or Firm*—Lathrop & Gage L.C.

(57) ABSTRACT

A compact disk identification system (50) utilizes a destructible adhesive sticker (20) to identify the owner of a compact disk (40). The sticker includes a top layer (22) that is marked with printed indicia (26) providing ownership information. The top layer is backed by an adhesive face (34) covered with an adhesive providing an adhesive strength exceeding the tear strength of the top layer. The top layer is affixed to the compact disk using a base plate (52) and a pestle (54) having a central cylinder (62). A very close tolerance between the cylinder, the disk, the top layer, and the pestle provides a substantially perfect central alignment of the top layer on the disk.

2 Claims, 1 Drawing Sheet

ADHESIVE STICKER LABELING SYSTEM FOR USE IN IDENTIFYING OWNERSHIP OF COMPACT DISKS

This application is a divisional of application Ser. No. 08/573,446, filed Dec. 15, 1995, now U.S. Pat. No. 6,227,273.

BACKGROUND OF THE INVENTION

FIELD OF THE INVENTION

The present invention pertains to the field of methods and apparatus for use in labeling compact disks. More specifically, the method and apparatus utilizes adhesive stickers to affix ownership information to the compact disk.

STATEMENT OF THE PROBLEM

Compact disks are optical storage media used to store sound recordings, computer programs, or computer-accessible data. The disks are typically made of plastic material in which laser-readable data tracks are embedded. In recent years, compact disks have become the medium of choice for sales of sound recordings and large compilations of personal computer-accessible information because the disks are very small and can store tremendous amounts of information. Compact disk users often expend large sums of money to acquire a small-to-medium sized collection of fifty sound recording disks having an average cost of sixteen dollars apiece. Compact disks that are used with computers can each be worth fifty to a hundred dollars or more. The cost of replacing a collection of compact disks in an individual home can be substantial. Additionally, many disks cannot even be replaced because the production run of that particular disk has ended or is out of date.

Compact disks are often stolen or misplaced. A thief can quickly and easily remove the disks from a disk storage location in a home or an automobile. The stolen disks are easily concealed in a pocket or a purse. Specialty shops that deal in resale of sound recording disks have enhanced the market for stolen disks. In other instances, an individual may lend a disk to another person who forgets to return the disk to its rightful owner.

U.S. Pat. No. 5,435,246 describes a labeling kit that can be used to stamp compact disks with printed indicia which serves to identify the owner of the compact disk. A number of problems derive from the use of ink on the stamping apparatus. Blurring of the printed indicia on the compact disk occurs as the stamp is inadvertently rotated while it is compressed against the compact disk. Additionally, the dried ink is readily scratched from the plastic to which it is applied. The removal of ink from the compact disk erases all evidence of prior ownership. Inadvertent scratching of the ink produces a residue that may interfere with the internal components of the disk drive mechanisms which are used to read information from the disk.

There exists a need for an improved disk labeling system that does not produce blurred printed indicia, and which provides a label that cannot be easily removed from the compact disk.

SOLUTION

The present invention overcomes the problems that are outlined above by providing a permanently mounted destructible adhesive sticker or label for use in identifying the owner of a compact disk. The sticker can be applied to the compact disk through the use of a special labeling system. The present invention also contemplates tracking the disk ownership through an ownership database.

An adhesive sticker according to the present invention is made of a circular sheet of material having a central circular aperture of a diameter (e.g., greater than 15 mm) sufficient to circumscribe the central opening in a compact disk without protruding into the opening where the sticker would, otherwise, interfere with the operation of the disk drive mechanism. The sheet of materials add excessive weight that can interfere with the operation of the disk drive mechanism. The most preferred sticker thickness ranges from 0.03 to 0.2 mm. The outer sticker diameter is preferably less than 29.2 mm because this diameter corresponds to the size of a central depression that is found on most commercially available sound recording disks.

The circular sheet of material has a first face that bears printed indicia which serves to identify an owner of the compact disk to which the sticker is attached. The circular sheet of material has an adhesively backed second face that is remote from the first face. The adhesive on the second face adheres to the plastic of a compact disk with a force that normally precludes removal of the circular sheet of material without tearing thereof. This feature of the sticker adhesive makes the sticker destructible in the event that someone attempts to remove the sticker from the compact disk.

The sticker is preferably affixed to the compact disk through the use of a special labeling system. The labeling system includes a base plate having a central upwardly raised platform and a central cylinder that is raised to a greater height than the platform. A pestle is used to press the sticker against the compact disk when the cylinder is inserted through a hole in the disk and a central opening in the sticker. They system serves to align the sticker on the disk with extremely close tolerances to prevent the disk from becoming unbalanced by an eccentric sticker.

Other salient features, objects, and advantages will be apparent to those skilled in the art upon a reading of the discussion below in combination with the accompanying drawings.

DETAILED DESCRIPTION OF THE PREFERRED EMBODIMENT

Figure 1:
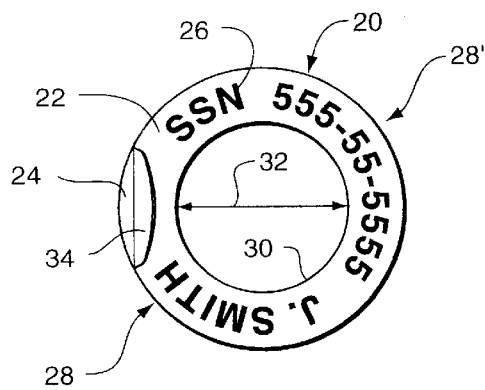
FIG. 1 depicts an adhesive sticker according to the present invention.

FIG. 1 depicts a top plan view of a circular identification sticker 20. Sticker 20 is a laminate that includes a top layer 22 and a release layer 24. The upper face of top layer 22 bears printed indica 26 including ownership identification information, e.g., the social security number 555-55-5555 for one John Smith as the owner of the disk. Indicia 26 can include other information, such as a telephone number with a request to call that number, or an alphanumeric sequence that is a unique identifier to a central computer database. Indicia 26 also preferably includes information (e.g., a telephone number) describing how to contact an ownership registration database. For example, indicia 26 could recite in small print "Telephone (777) 777-7777 for ownership registration information." Indicia 26 is preferably printed with permanent or indelible ink, such as the 99S150 ink made by Colonial Printing Inks.

Top layer 22 is preferably made of a vinyl material having a thickness no greater than about 0.8 mm. The thickness preferably ranges from 0.02 mm to 0.08 mm. Greater thickness add weight that can interfere with the operation of a compact disk. Top layer 22 has a maximum diameter taken across line 28–28' that preferably does not exceed 29.2 mm. Layer 22 has a central circular opening 30 that preferably presents a diameter greater than 15 mm taken across line 32. The diameter across line 32 even more preferably has a strength of adherence that exceeds the strength of top layer 22 when the adhesive is affixed to a compact disk. Thus, the top layer 22 cannot be removed from a compact disk without destroying or tearing top layer 22. Suitable adhesives for this application are classified in the industry as permanent pressure sensitive adhesives. Specific adhesives can be tested for suitability by applying the adhesive to a sticker, such as sticker 22, applying the sticker to a compact disk, and attempting to remove the sticker without destroying the sticker.

Release layer 24 is preferably a silicone-covered release paper. As depicted, release layer 24 can be formed to the exact dimensions of top layer 24, or it can be made in square sheets that carry a plurality of pieces formed as top layer 22.

Figure 2:
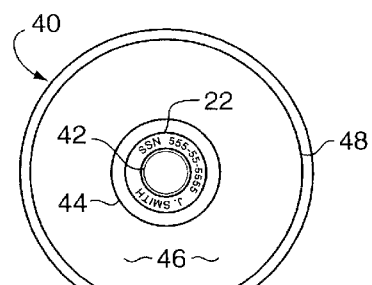
FIG. 2 depicts a top plan view of the FIG. 1 adhesive sticker, as it appears installed on the upper surface of a compact disk.

FIG. 2 depicts a top plan view of top layer 22 of sticker 20 affixed to a standard compact disk 40. Disk 40 is a conventional plastic sound recording disk. Micrometer measurements conducted on a commercially acquired disk 40 indicate a maximum outer diameter of 120 mm, a central hole 42 having an outer diameter of 15 mm, and a circular central upwardly raised ring circumscribing hole 42 to an outer diameter of about 34 mm and an inner diameter of about 33 mm. Exact specifications for commercially available sound recording compact disks are found in ANSI specifications, and may be obtained from the disk manufacturers of different types of optical storage disks. Ring 44 circumscribes a central region 46 that extends between ring 44 and a radially outboard margin 48. Region 46 includes a plurality of conventional data tracks that contain stored information corresponding to a sound recording or computer data. Region 46 may also contain any other type of data. The data tracks in region 46 are accessed by a compact disk drive mechanism from a face 47 (see FIG. 3) of disk 40 that is remote from top layer 22.

Figure 3:
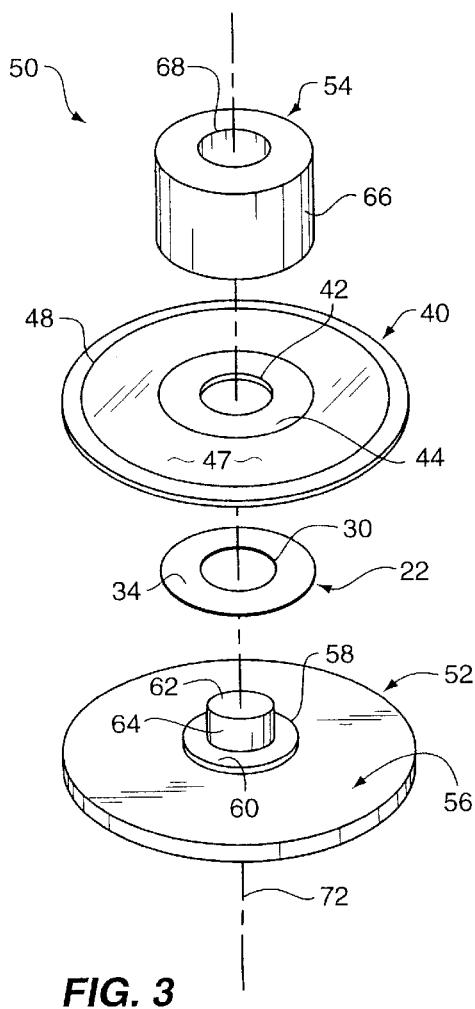
FIG. 3 depicts a front elevational perspective view of a labeling system that is used for affixing the FIG. 1 adhesive sticker to the compact disk as shown in FIG. 3.

FIG. 3 depicts a labeling system 50 for use in applying top layer 22 of sticker 20 to a compact disk 40 as depicted in FIG. 2. Labeling system 50 includes an integrally formed base plate 52 and pestle 54, which are both preferably made of a synthetic resin. Base plate 52 includes a flat cylindrical bottom support member 56. The central portion of bottom support member 56 includes an upwardly raised circular platform 58 having a flat upper face 60 and an outer diameter equal to the inner diameter of ring 44. Platform 58 is preferably raised above bottom support member 56. The central portion of platform 58 includes an upwardly raised cylinder 62 that preferably has an outermost diameter providing a close tolerance of no more than about 0.2 mm between the outermost diameter of a sidewall 64 and the innermost diameter of hole 42. The 0.2 mm tolerance also preferably exists between the outermost diameter of sidewall 64 and the innermost diameter of opening 30. Bottom support member 56, central platform 58, and cylinder 62 are preferably formed as one piece of injection-molded synthetic resin.

Pestle 54 is preferably a tubular member having an outer wall 66 circumscribing a central aperture 68. Aperture 68 preferably has an inner diameter equal to the inner diameters of hole 42. The opposite (upper and lower) ends of outer wall 66 include flat faces, e.g., face 70.

In operation, compact disk 40 is acquired from a commercial source. At this time, disk 40 does not include any identification of the owner of disk 40 who has just made the purchase. The owner peels top layer 22 away from release layer 24, and places top layer 22 on base plate 52 by inserting cylinder 62 through hole 30 with indicia 26 facing surface 60. Thus, adhesive face 34 is exposed upwardly away from surface 60.

In the next step, the owner places disk 40 on base plate 52 by aligning hole 42 with cylinder 62 along centerline 72, and causing cylinder 62 to pass through hole 42. In this configuration, the surface of region 46 rests on adhesive face 34 which is, in turn, supported by surface 60. Thus, a gap substantially equal to the height of raised platform 58 and the thickness of sticker 22 exists between disk 40 and bottom support member 56. This gap prevents scratching of disk 40 that, otherwise, would occur if disk 40 were permitted to contact bottom support member 56. Disk 40 is retained on platform 58 in a substantially perfect central alignment with respect to centerline 72 by virtue of the close 0.2 mm tolerance between sidewall 64 and the inner diameter defining hole 42.

Top layer 22 is firmly affixed to disk 40 by using pestle 54 to compress top layer 22 against region 46. Cylinder 62 is inserted into aperture 68, and a flat face, e.g., the face remote from face 70, of pestle 54 is compressed against top layer 22 forcing adhesive face 34 against the upper surface of region 46. The side of region 46 remote from top layer 22 is, in turn, forced against face 60 of raised platform 58.

Pestle 54 and disk 40 including top layer 22 are subsequently removed from their respective positions surrounding cylinder 62. Top layer 22 bears indicia that serves to identify the owner of disk 40. Someone who subsequently attempts to remove top layer 22 from its location on disk 40 will find that task to be extremely difficult, if not impossible. The adhesive that coasts adhesive face 34 adheres to face 34 of top layer 22 and the plastic region 46 with a strength that exceeds the strength of the material in top layer 22. This strong adhesive prevents peeling of top layer 22 away from its position adjoining region 46. Top layer 22 can only be removed by scraping or by exposure to elevated temperatures. Both of these actions, if taken to remove top layer 22, would carry a substantial risk of destroying disk 40 for use in its intended role. Scrape marks or residual adhesive would remain even after the removal of top layer 22, and these residual effects of sticker removal would substantially degrade the resale value of disk 40.

The owner preferably purchases a plurality of identification stickers, such as sticker 20, from a commercial supplier of these stickers. The commercial supplier also preferably provides a service that accesses a computerized ownership registration database 74. In this case, the portion of indicia 26 reading SSN 555-555-5555 serves to identify John Smith as the disk owner. The computer database is able to provide an address and telephone number for John Smith. Thus, a police agency or used disk reseller who suspects a disk is stolen can contact the central registry for purposes of identifying a possible true owner of the disk. The supplier is able to supply the police agency to contact the possible true owner. Additionally, the database may be as simple as a sheet of paper that a library uses to track disks having identification numbers (e.g. Dewey decimal numbers) as indicia 26.

Other materials may be substituted for the preferred materials that are described above. For example, top layer 40 may be made of a paper material, and a suitable adhesive may be selected for use with the paper. The use of paper is preferably accompanied by the use of an indelible printing ink. The paper material carries the disadvantage of the top layer 22 being easier to remove through the use of solvents (e.g., water) that do not degrade the preferred vinyl material. Bottom support member 56 never contacts disk 40, and may assume any geometric configuration, e.g., as a square, a rectangle, or a rhombus. The preferred dimensions recited are particularly preferred for use with conventional sound recording disks that are presently on the market, but may be varied to conform with other standard disk sizes that may arise in the future.

Those skilled in the art will understand that the preferred embodiments, as hereinabove described, may be subjected to apparent modifications without departing from the true scope and spirit of the invention. The inventor, accordingly, hereby state his intention to rely upon the Doctrine of Equivalents, in order to protect their full rights of the invention.

What is claimed is:

1. A labeling system for use in applying adhesive stickers that are used to identify ownership of compact disks, said system comprising:

at least one circular sheet of material having dimensions sufficient to circumscribe a central opening on a compact disk;

said circular sheet of material having a first face bearing printed indicia thereon, said indicia comprising an identifier, said circular sheet of material having a second face remote from said first face, said second face being coated with an adhesive providing means for adhering to said compact disk with a force that prevents removal of said circular sheet of material without tearing of said circular sheet of material;

a release sheet covering said second face in contact with said adhesive;

a base plate including
      a bottom support member,
      a compression platform rising from said bottom support member and having dimensions sufficient to accommodate said circular sheet of material for compression purposes, and
      an upwardly raised cylinder positioned at a central location with respect to said compression platform, said cylinder having an outer radial dimension sufficient to be received through said opening in said compact disk; and a tubular pestle having an outer wall providing means for compressing said circular sheet of material against a compact disk inserted between said circular sheet of material and said compression platform, said outer wall circumscribing a central opening having a sufficient radius for receipt of said cylinder.

2. The disk labeling system as set forth in claim 1, the bottom support member having outer dimensions permitting superposition of said compact disk with an outer diameter of said compact disk in substantial alignment with said outer dimensions.

* * * * *